United States Patent
Ju et al.

(10) Patent No.: US 11,694,555 B2
(45) Date of Patent: Jul. 4, 2023

(54) SERVER FOR PROVIDING PASSENGER TRANSPORTATION SERVICE AND METHOD THEREOF

(71) Applicants: Hyundai Motor Company, Seoul (KR); Kia Corporation, Seoul (KR)

(72) Inventors: Younghyun Ju, Yongin-Si (KR); Soo Young Kim, Seoul (KR); Gi Seok Park, Seoul (KR); Jonghoon Kim, Yongin-Si (KR); Kyong Enn Min, Seongnam-Si (KR); Hyungu Roh, Seongnam-Si (KR); Hee Su Shin, Yongin-Si (KR); SungEun Kim, Seoul (KR); Minwoo Kwak, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 134 days.

(21) Appl. No.: 17/459,977

(22) Filed: Aug. 27, 2021

(65) Prior Publication Data
US 2022/0130256 A1 Apr. 28, 2022

(30) Foreign Application Priority Data
Oct. 23, 2020 (KR) .................. 10-2020-0138556

(51) Int. Cl.
*G08G 1/00* (2006.01)
*G06T 7/70* (2017.01)
(Continued)

(52) U.S. Cl.
CPC .............. *G08G 1/202* (2013.01); *G06T 7/20* (2013.01); *G06T 7/70* (2017.01); *G06V 20/58* (2022.01);
(Continued)

(58) Field of Classification Search
None
See application file for complete search history.

(56) References Cited

U.S. PATENT DOCUMENTS 10,134,286 B1 * 11/2018 Elswick .................. G08G 1/205
11,010,693 B2 * 5/2021 Sarawgi .................. G06Q 10/00
(Continued)

FOREIGN PATENT DOCUMENTS

JP      H 10-208195 A    8/1998
JP      2019-500681 A    1/2019
(Continued)

*Primary Examiner* — Thomas S McCormack
(74) *Attorney, Agent, or Firm* — Morgan, Lewis & Bockius LLP

(57) ABSTRACT

A server for providing a passenger transportation service, may include a registered location database configured to store position information and image information related to each of previously registered get-on-and-off locations, a registered location management module configured to receive image data photographed from vehicles providing passenger transportation service during running and additional information including position information related to each of the image data, and update the image information based on the additional information by use of the image data, and a service providing module configured to, upon receiving a service provision request including position information and destination information related to a user from a user terminal, select a get-on location and a get-off location from among the get-on-and-off locations based on the position information and the destination information related to the user, and transmit get-on-and-off information including image data of the get-on location to the user terminal.

21 Claims, 5 Drawing Sheets

(51) Int. Cl.
*G06T 7/20* (2017.01)
*G06V 20/58* (2022.01)

(52) U.S. Cl.
CPC ............... *G06T 2207/30244* (2013.01); *G06T 2207/30261* (2013.01)

(56) References Cited

U.S. PATENT DOCUMENTS

| | | | |
|---|---|---|---|
| 2017/0138749 A1 | 5/2017 | Pan et al. | |
| 2017/0192436 A1 | 7/2017 | Min et al. | |
| 2019/0129438 A1* | 5/2019 | Morita | G05D 1/0088 |
| 2020/0124427 A1* | 4/2020 | Kline | G07C 5/008 |
| 2020/0326714 A1* | 10/2020 | Iwamoto | G08G 1/148 |
| 2020/0408548 A1* | 12/2020 | DiCarlo | G08G 1/202 |
| 2021/0403053 A1* | 12/2021 | Choi | B60W 60/00253 |
| 2021/0407150 A1* | 12/2021 | Czymontek | G06Q 50/30 |

FOREIGN PATENT DOCUMENTS

| | | |
|---|---|---|
| JP | 2019-121039 A | 7/2019 |
| KR | 10-1350227 B1 | 1/2014 |
| KR | 10-1554347 B1 | 9/2015 |
| KR | 10-1917316 B1 | 11/2018 |
| KR | 10-2075318 B1 | 2/2020 |
| KR | 10-2113816 B1 | 6/2020 |
| KR | 10-2151910 B1 | 9/2020 |

\* cited by examiner

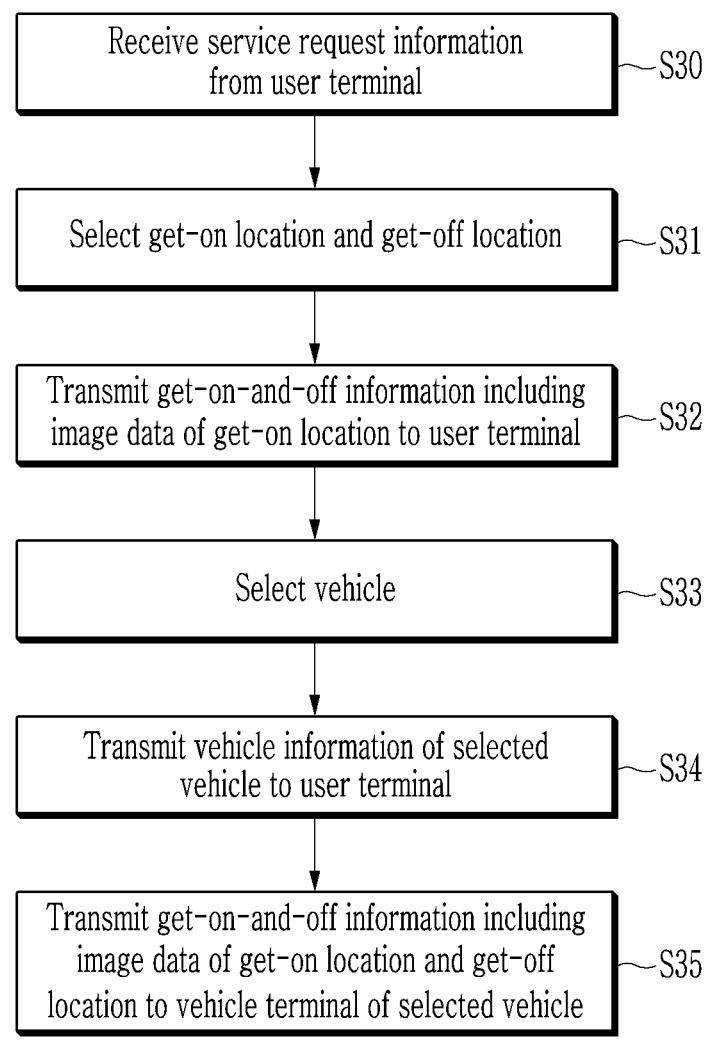

SERVER FOR PROVIDING PASSENGER TRANSPORTATION SERVICE AND METHOD THEREOF

CROSS-REFERENCE TO RELATED APPLICATION

The present application claims priority to Korean Patent Application No. 10-2020-0138556 filed on Oct. 23, 2020, the entire contents of which is incorporated herein for all purposes by this reference.

BACKGROUND OF THE INVENTION

Field of the Invention

The present invention relates to a server for providing a passenger transportation service and a method thereof.

Description of Related Art

A ridesharing service refer to a passenger transportation service that connects vehicles and drivers to passengers through the Internet or mobile application software. When a user requests the ridesharing service, a driver of a vehicle selected as a transportation vehicle provides the ridesharing service by picking up the user at a get-on location determined by the user's position and transporting the user to a get-off location determined by the user's destination.

To provide the ridesharing service, the user using the ridesharing service and the driver of the vehicle need to share information related to the get-on location and get-off location. Therefore, when the get-on location and get-off location are determined, the server operating the ridesharing service provides information on the get-on and get-off locations to a user terminal and a vehicle terminal of the vehicle.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a server for providing a passenger transportation service and a method thereof having advantages of providing intuitive information on get-on-and-off locations to users and drivers, increasing convenience of users and drivers.

A server for providing a passenger transportation service, may include a registered location database configured to store position information and image information related to each of previously registered get-on-and-off locations, a registered location management module configured to receive image data photographed from vehicles providing passenger transportation service during running and additional information including position information related to each of the image data, and update the image information based on the additional information by use of the image data, and a service providing module configured to, upon receiving a service provision request including position information and destination information related to a user from a user terminal, select a get-on location and a get-off location from among the get-on-and-off locations based on the position information and the destination information related to the user, and transmit get-on-and-off information including image data of the get-on location to the user terminal. The service providing module may be configured to obtain image data of the get-on location from the image information related to a location selected as the get-on location from among the get-on-and-off locations.

The registered location management module may be configured to select a candidate group corresponding to each in the get-on-and-off locations among the image data based on position information related to each of the image data, give priority to each image data included in the candidate group based on object information extracted from each image data included in the candidate group, select image data having a highest priority among image data included in the candidate group as final candidate image data, and update the image information related to corresponding get-on-and-off locations by use of the final candidate image data.

The object information may include information on a ratio of an obstacle or a moving object in corresponding image data. The registered location management module may be configured to set a priority of the corresponding image data lower as the ratio of the object corresponding to the obstacle or the ratio of the moving object is higher.

The registered location management module may be configured to exclude image data of which the ratio of the obstacle in the image data or the ratio of the moving object in the image data is above a predetermined value from the candidate group.

The object information may include information on identified facility within corresponding image data. The registered location management module may be configured to set a priority of the corresponding image data to be high, when the identified facility is a facility registered as a point of interest (POI), or when the identified facility is a predetermined type of facility.

The additional information may further include information on a running direction of the vehicle at photographing with respect to each of the image data. The registered location management module may be configured to, with respect to the image information including a plurality of image data corresponding to different photographing directions, select image data of which a photographing direction corresponds to the running direction of the final candidate image data among the plurality of image data included in the image information as an object to be updated, and update the image data selected as the object to be updated by use of the final candidate image data.

When the image information related to the get-on-and-off locations selected as the get-on location includes a plurality of image data corresponding to different photographing directions, the service providing module may be configured to, obtain an approaching direction of the user to the get-on location based on position information related to the user, and select image data whose corresponding photographing direction matches the approaching direction among the plurality of image data as image data of the get-on location.

An exemplary server may further include a vehicle database including vehicle information related to each of the vehicles. The service providing module may be configured to, based on position information and the destination information related to the user and the vehicle information, select a vehicle to provide the service to the user from the vehicles, obtain image data of the get-off location from the image information related to a location selected as the get-off location from among the get-on-and-off locations, and transmit the get-on-and-off information including the image data of the get-on location and the image data of the get-off location to a vehicle terminal of the selected vehicle.

The service providing module may be configured to transmit information on at least one of vehicle identification number, a driver's contact number, and a current position of the selected vehicle to the user terminal.

The registered location database may be configured to store position information and image information related to each of previously registered transit locations. The service providing module may be configured to transmit position information and image data of each of at least one transit location included in a path from the get-on location to the get-off location among the transit locations, to the vehicle terminal.

The registered location management module may be configured to update image information related to each of the transit locations based on the additional information by use of the image data.

The transit locations may be locations corresponding to branch roads, intersections, roads with high complexity, or alleys.

An operation method of a server for providing a passenger transportation service, the operation method may include a registered location database configured to store position information and image information related to each of previously registered get-on-and-off locations, receiving additional information including image data photographed from vehicles providing passenger transportation service during running, and position information related to each of the image data, updating image information related to each of the previously registered get-on-and-off locations by use of the image data, based on the additional information, receiving a service provision request including position information and destination information related to a user from a user terminal, selecting a get-on location and a get-off location from among the get-on-and-off locations based on the position information and the destination information related to the user, obtaining image data of the get-on location from the image information related to a location selected as the get-on location from among the get-on-and-off locations, and transmitting get-on-and-off information including image data of the get-on location to the user terminal.

The updating may include selecting a candidate group corresponding to each in the get-on-and-off locations among the image data based on position information related to each of the image data, giving a priority to each image data included in the candidate group based on object information extracted from each image data included in the candidate group, selecting image data having a highest priority among image data included in the candidate group as final candidate image data, and updating the image information related to corresponding get-on-and-off locations by use of the final candidate image data.

The object information may include information on a ratio of an obstacle or a moving object in corresponding image data. The giving of the priority may include setting the priority of the corresponding image data lower as the ratio of the object corresponding to the obstacle or the ratio of the moving object is higher.

The object information may include information on an identified facility within corresponding image data. The giving of the priority may include setting the priority of the corresponding image data to be high when the identified facility is a facility registered as a point of interest (POI), or when the identified facility is a predetermined type of facility.

The additional information may further include information on a running direction of the vehicle at photographing with respect to each of the image data. The updating may include selecting, with respect to the image information including a plurality of image data corresponding to different photographing directions, image data of which a photographing direction matches the running direction of the final candidate image data among the plurality of image data included in the image information as an object to be updated, and updating the image data selected as the object to be updated by use of the final candidate image data.

The obtaining of the image data of the get-on location may include obtaining an approaching direction of the user to the get-on location based on position information related to the user, when the image information related to the get-on-and-off locations selected as the get-on location includes a plurality of image data corresponding to different photographing directions, and selecting image data whose corresponding photographing direction matches the approaching direction among the plurality of image data as image data of the get-on location.

An exemplary operation method may further include obtaining image data of the get-off location from the image information related to a location selected as the get-off location from among the get-on-and-off locations, selecting a vehicle to provide the service to the user from the vehicles based on position information and the destination information related to the user and vehicle information related to each of the vehicles, and transmitting get-on-and-off information including the image data of the get-on location and image data of the get-off location to a vehicle terminal of a selected vehicle.

An exemplary operation method may further include transmitting information on at least one of vehicle identification number, a driver's contact number, and a current position of the selected vehicle to the user terminal.

An exemplary operation method may further include transmitting position information and image data of each of at least one transit location included in a path from the get-on location to the get-off location among previously registered transit locations, to the vehicle terminal.

According to various exemplary embodiments of the present invention, by providing intuitive information with respect to get-on-and-off locations to the user and the driver, convenience for the user and the driver may be increased.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart showing a method for providing a passenger transportation service by an operation server according to an exemplary embodiment of the present invention.

Figure 1:
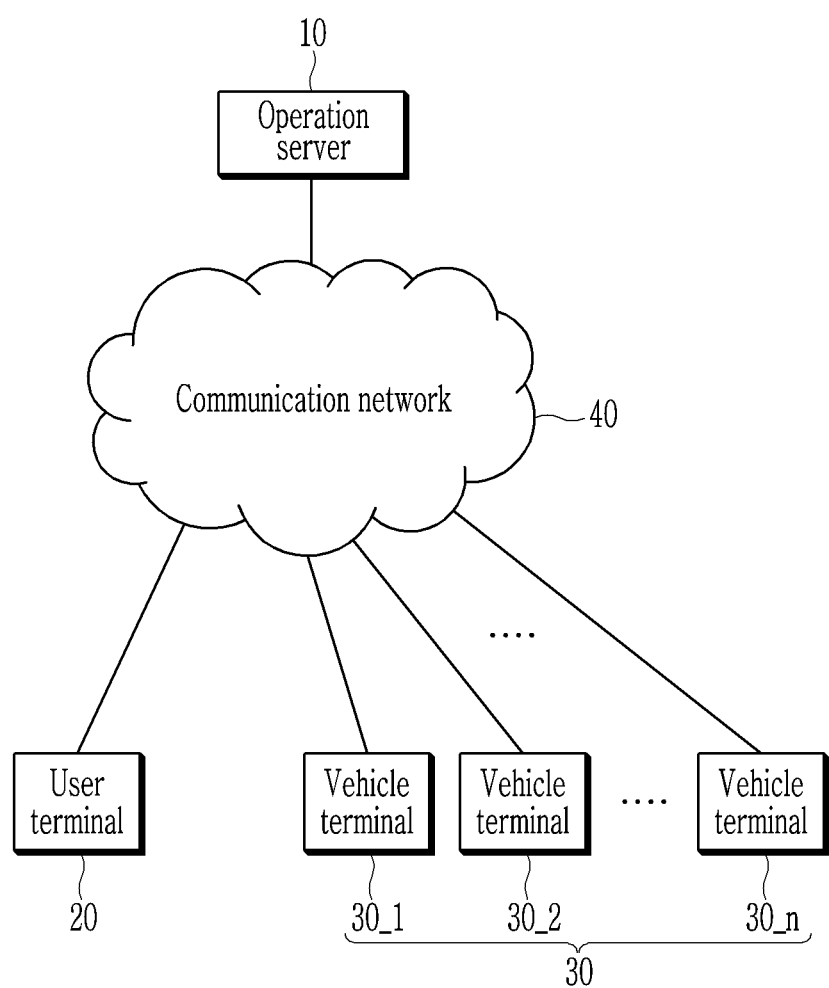
FIG. 1 illustrates a passenger transportation service system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the other hand, the present invention(s) is/are intended to cover not only the exemplary embodiments, but also various alternatives, modifications, equivalents and other embodiments, which may be included within the spirit and scope of the present invention as defined by the appended claims.

Hereinafter, various exemplary embodiments included in the present embodiment will be described in detail with reference to the accompanying drawings. In the present embodiment, the same or similar components will be denoted by the same or similar reference numerals, and a repeated description thereof will be omitted. Terms "module" and/or "unit" for components used in the following description are used only to easily describe the specification. Therefore, these terms do not have meanings or roles that distinguish them from each other in and of themselves. In describing exemplary embodiments of the present embodiment, when it is determined that a detailed description of the well-known art associated with the present invention may obscure the gist of the present invention, it will be omitted. The accompanying drawings are provided only to allow exemplary embodiments included in the present embodiment to be easily understood and are not to be interpreted as limiting the spirit included in the present embodiment, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Furthermore, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Furthermore, the terms "-er", "-or", and "module" described in the specification mean units for processing at least one function and operation, and may be implemented by hardware components or software components, and combinations thereof.

FIG. 1 illustrates a passenger transportation service system according to an exemplary embodiment of the present invention.

Referring to FIG. 1, a passenger transportation service system is a system that provides a passenger transportation service in a form of ridesharing, and may include an operation server 10, a user terminal 20, and a vehicle terminal 30.

The vehicle terminal 30 is mounted in all vehicles providing the passenger transportation service. FIG. 1 illustrates that n (which is a natural number greater than 1) vehicles are providing the passenger transportation service. FIG. 1 illustrates only one user terminal 20, however, the present invention is not limited thereto. It may be understood that a plurality of user terminals may use the passenger transportation service system.

Transmission and reception of information between the user terminal 20 and the operation server 10 and transmission and reception of information between the vehicle terminals 30_1 to 30_n and the operation server 10 is made through a communication network 40.

A user (hereinafter, also called a passenger) willing to use the passenger transportation service may input information associated to a destination and position information related to the user into the user terminal 20, and the user terminal 20 may transmit the input data to the operation server 10. The position information related to the user may be based on a currently recognized position utilizing a global positioning system (GPS) of the user terminal 20. Alternatively, the position information related to the user may be information associated with a position which the user specifies through the user terminal 20.

The user terminal 20 may receive information related to a get-on location and a get-off location from the operation server 10. The user terminal 20 may receive information from the operation server 10, such as a vehicle identification number, a vehicle driver's contact information, an expected arrival time of the vehicle to the get-on location (hereinafter, an expected get-on time), an expected arrival time of the vehicle to the get-off location (hereinafter, an expected get-off time), etc., along with the get-on location and the get-off location.

The user terminal 20 may receive charging information for a transportation service fare from the operation server 10 and pay the fare based on the charging information. The user terminal 20 may receive identification information for identifying a passenger from the operation server 10, and may display the identification information on a display of the user terminal 20.

The user terminal 20 may be a smart phone, a laptop, a tablet PC, etc., and an application to use the passenger transportation service may be provided in the user terminal 20. The user terminal 20 may perform the aforementioned operations through the provided application.

Each of the vehicle terminals 30_1 to 30_n is provided in each of the vehicles used in the passenger transportation service. Each of the vehicle terminals 30_1 to 30_n may transmit a current position of the vehicle to the operation server 10 in real time, and may receive, from the operation server 10, information related to the get-on location and the get-off location with respect to each passenger to use the vehicle and information related to an expected get-on time for each get-on location and an expected get-off time for each get-off location. Each of the vehicle terminals 30_1 to 30_n may also receive an identification information for each passenger to use the vehicle from the operation server 10.

The identification information for each passenger may be transmitted from the operation server 10 to both of user terminals of each passenger and the vehicle terminal of the vehicle to be used by each passenger.

The vehicle terminal 30 may be a smart phone, a laptop, a tablet PC, etc., and an application for providing the passenger transportation service may be provided in the vehicle terminal 30. The vehicle terminal 30 may perform the aforementioned operations through the provided application.

The operation server 10 receives information for the destination and a current position from the user terminal 20, and may select a get-on location and a get-off location for the user corresponding to the information related to the current position and the destination received from. When the user's get-on location and get-off location are selected, the operation server 10 may select a vehicle to pass through the selected get-on location and get-off location.

The operation server 10 may transmit information related to the get-on location and get-off location, the expected get-on time and expected get-off time, and the passenger identification information to the vehicle terminal 30_i (here, i is a natural number from in 1 to n) of the selected vehicle and the user terminal 20. Furthermore, the operation server 10 may further transmit the vehicle identification number, the vehicle driver's contact information, charging information to the user terminal 20, and the like.

Furthermore, the user terminal 20 may further perform an operation required to request the passenger transportation service, if applicable. The vehicle terminal 30 may further perform an operation required to provide the passenger transportation service, if applicable. The operation server 10 may provide a further service to the user terminal 20 or the vehicle terminal 30, if applicable. The content described in various exemplary embodiments of the present invention does not limit the application of the technology not described to the present invention. That is, a new service may be provided by combining the present invention with currently known technologies, and the contents described in various exemplary embodiments of the present invention do not limit such variation.

Hereinafter, a configuration of the operation server 10 for providing the passenger transportation service is described in detail with reference to FIG. 2.

Figure 2:
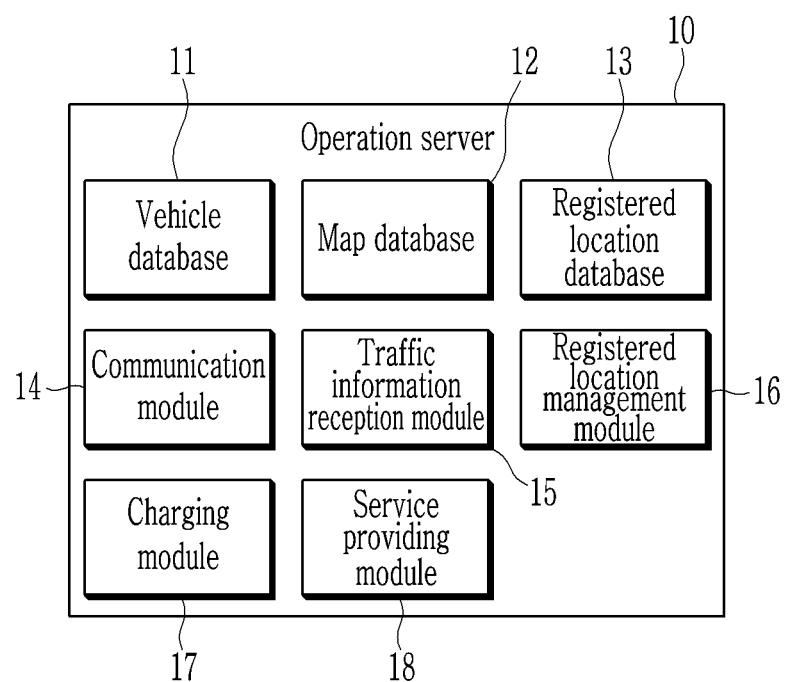
FIG. 2 schematically illustrates an operation server according to an exemplary embodiment of the present invention.

FIG. 2 schematically illustrates an operation server according to an exemplary embodiment of the present invention.

Referring to FIG. 2, the operation server 10 according to various exemplary embodiments of the present invention may include a vehicle database 11, a map database 12, a registered location database 13, a communication module 14, a traffic information reception module 15, a registered location management module 16, a charging module 17, and a service providing module 18. The components illustrated in FIG. 2 are not necessarily essential to various exemplary embodiments of the present invention, thus the operation server 10 described in various exemplary embodiments of the present invention may include a larger or smaller number of components than those described above.

The vehicle database 11 may include vehicle information related to each vehicle providing passenger transportation service. The vehicle information related to each vehicle may include vehicle identification number of the vehicle, vehicle driver's contact information, current position information, vehicle running information, passenger information, and the like. Here, the vehicle running information may include whether the vehicle is in standby or running. Furthermore, the vehicle running information may further include moving path information related to the vehicle including information on the get-on location and the get-off location that the vehicle is to pass through, and the like, when the vehicle is running. The passenger information may include information (number of people, identification information, and the like) of the passenger currently on board the vehicle.

The map database 12 may store map information in a form of a digital map. In the map information in a form of a digital map, each road may be divided into at least one link. The map information may include link information related to each link. Here, the link information may include link identification information, link property information, link section information (start point, end point), minimum/maximum speed information, road property information (highway, freeway, and the like), point of interest (POI) information, and the like. Furthermore, the POI information is information on major facilities (e.g., stations, airports, terminals, hotels, churches, schools, convenience stores, and the like) around each link, and may include identification information, position information, and the like of each facility.

The registered location database 13 may store information (hereinafter, referred to as the get-on-and-off locations information) on each location registered as a get-on-and-off locations in the passenger transportation service. Each get-on-and-off location information may include identification information, position information, image information, and the like of the get-on-and-off location. The image information related to the get-on-and-off locations may include image data photographing surroundings of the get-on-and-off locations. The image information related to the get-on-and-off locations may include a plurality of image data photographed in different directions. For example, the image information related to the get-on-and-off locations positioned at an intersection may include a plurality of image data photographed while approaching the get-on-and-off locations from different branch roads. When the image information related to the get-on-and-off locations includes the plurality of image data, the image information may further include information on a photographing direction (or, an approaching direction) corresponding to each image data.

The registered location database 13 may also store information (hereinafter, referred to as a transit location information) on each in major transit locations (or pass-through locations) passed through by vehicles providing the passenger transportation service during the passenger transportation. For example, the registered location database 13 may store locations that require attention of the driver, such as branch roads, intersections, roads with high complexity, alleys, and the like, as transit location information. Each transit location information may include identification information, position information, image information, and the like of the transit location. Image information related to the transit location may include image data photographing surroundings of the transit location. The image information related to the transit location may include a plurality of image data photographed in different directions. For example, the image information related to a transit location positioned at an intersection may include a plurality of image data photographed while approaching the transit location from different branch roads. When the image information related to the transit location includes a plurality of image data, the image information may further include information on a photographing direction (or, an approaching direction) corresponding to each image data.

The communication module 14 may transmit and receive information with the user terminals 20 or the vehicle terminals 30 through the communication network 40. Furthermore, the communication module 14 may transmit and receive information with a traffic information providing server to receive traffic information.

The traffic information reception module 15 may receive traffic information from the traffic information providing server through the communication module 14. The traffic information may include current speed information, traffic event information, and the like of each road. The traffic event represents various events occurring on the like road such as congestion, accident, construction, and the like, and the traffic event information may include information on a traffic event type, an event occurrence section, and the like.

The registered location management module 16 may manage the get-on-and-off location information and the transit location information stored in the registered location database 13.

The registered location management module 16 may receive image data photographed by each vehicle terminal 30 during running of the vehicle, from each vehicle terminal 30 through the communication module 14.

Each vehicle terminal 30 may obtain image data photographing a surrounding environment (walking area) of the driving road through a camera during running of the vehicle. For the present purpose, the camera may be mounted in the vehicle in a position (e.g., a side surface of the vehicle) suitable for photographing the surrounding environment of the road. Furthermore, the camera may be provided with the photographing direction facing the surrounding environment, the walking area of the road. The vehicle terminal 30 may be always obtaining image data by photographing the surrounding environment through the camera while the vehicle is running. Furthermore, for efficiency, the vehicle terminal 30 may obtain the image by photographing the surrounding environment through the camera only in the case that a photographing request is received from the driver, or at the time of get-on-and-off of passengers. Furthermore, the vehicle terminal 30 may obtain the image by photographing the surrounding environment through the camera, when the vehicle approaches a position registered in the operation server 10 as the get-on-and-off locations or the transit location.

When the image data for the surroundings of the road on which the vehicle is running are obtained through the camera, the vehicle terminal 30 may transmit the obtained image to the operation server 10, along with additional information such as position information and running direction, get-on-and-off record, and the like of the vehicle at the time of photographing that image.

When the image data obtained in a way described above and additional information on each image data are received from the vehicle terminals 30, the registered location management module 16 may update the get-on-and-off location information stored in the registered location database 13, based on the received data and information.

The registered location management module 16 may select a candidate group which is selectable as the image data of the get-on-and-off locations among the image data received from the vehicle terminals 30 based on additional information related to each image data. For example, when the position information related to the image data of the vehicle at the time of photographing corresponds to previously registered get-on-and-off location, the registered location management module 16 may include that image data in the candidate group of the get-on-and-off location.

When the candidate group is selected with respect to each of the get-on-and-off locations, the registered location management module 16 may extract objects corresponding to obstacles, moving objects, or facilities from each image data selected as the candidate group, by performing object detection algorithm, moving object discrimination algorithm, sign recognition algorithm, and the like. Here, the moving object discrimination algorithm may be implemented by camera-based image analysis technology such as deep learning, and the like.

The registered location management module 16 may obtain object information including obstacle information, moving object information, facility information, and the like, from each image data selected as the candidate group, based on the type, quantity, size, and the like of objects extracted from each image data. The obstacle information may include information on whether an object predetermined as an obstacle such as a vehicle, and the like exists in the image data, and a ratio of obstacles in the image data. The moving object information may include information on whether an object corresponding to a moving object such as a vehicle, a person, a motorcycle, and the like exists in the image data, and a ratio of the moving object in the image data. The facility information may include information on whether an identifiable facility exists in the image data, visibility of the identified facility, and the like. The registered location management module 16 may extract the identifiable facility from the image data through the sign recognition algorithm, and may determine the visibility of the corresponding facility based on information (sign recognition information) of the extracted facility. When the facility extracted from the image data is, a facility registered in the map information as a POI, a specific type of facility easily recognized by people (e.g., a church, a school, a government office, a subway station, a convenience store, and the like), the registered location management module 16 may determine such facility as to have high visibility.

The registered location management module 16 may determine the priority each image data based on object information extracted from each image data included in the candidate group. The registered location management module 16 may set the priority of the corresponding image data lower, when the obstacle exists in the image data, and as a ratio of area occupied by the obstacle in the image data is higher. The registered location management module 16 may set the priority lower, when the moving object exists in the image data, and as a ratio of area occupied by the moving object in the image data is higher. The registered location management module 16 may set the priority higher, when the identifiable facility exists in the image data, and as the visibility of the identified facility is higher.

The registered location management module 16 may exclude, from the candidate group, an image of which the ratio of area occupied by the obstacle in the image data or the ratio of area occupied by the moving object in the image data is above a predetermined value. When there is no image data selected as the candidate group of a specific get-on-and-off locations for such reason, the registered location management module 16 may use image data re-photographed later by the vehicle terminal 30 with respect to that get-on-and-off locations as a candidate group for updating the image information.

When the priority of each image data included in the candidate group is determined, the registered location management module 16 may select the image data of which the priority is set highest in each candidate group as final candidate image data of that candidate group. When the final candidate image data are selected, the registered location management module 16 may update image information related to corresponding get-on-and-off locations stored in the registered location database 13 by use of the final candidate image data. That is, when the final candidate image data are determined in each candidate group, the registered location management module 16 may update the image information related to the corresponding get-on-and-off locations among the image information related to the get-on-and-off locations stored in the registered location database 13 by use of the final candidate image data.

Updating the image information related to the get-on-and-off locations while the surrounding environment of the get-on-and-off locations is not considerably changed may not be efficient. Therefore, the registered location management module 16 may update the image information related to the get-on-and-off locations by use of the image data received from the vehicle terminals 30, only with respect to the get-on-and-off locations of which the surrounding environment is changed due to seasonal change, facility change, sign change, road environment change, and the like. For the present purpose, when the final candidate image data with respect to the get-on-and-off locations are determined, the registered location management module 16 may compare the image data of that get-on-and-off locations stored in the registered location database 13 with the final candidate image data, and may determine whether to update the image information related to the get-on-and-off location, based on the result of the comparison. That is, the registered location management module 16 may extract feature points respectively from the final candidate image data with respect to the get-on-and-off locations and the image data of that get-on-and-off locations stored in the registered location database 13, and may update the image information related to the corresponding get-on-and-off locations by the final candidate image data when a difference between feature points of the two image data is above predetermined level.

As described above, the image information related to the get-on-and-off locations stored in the registered location database 13 may include the plurality of image data corresponding to different photographing directions (or, approaching directions). In the instant case, the registered location management module 16 may identify the running direction of the vehicle at the time of photographing the final candidate image data from the additional information received from the vehicle terminal 30 along with the final candidate image data. Furthermore, the registered location management module 16 may select an object to be updated among the plurality of image data included in the image information related to the corresponding get-on-and-off locations based on the identified running direction of the vehicle. That is, the registered location management module 16 may select the image data of which the identified running direction of the vehicle and the photographing direction (i.e., approaching direction) match each other among the image data of corresponding get-on-and-off locations stored in the registered location database 13, as the object to be updated. When the object to be updated is selected, as described above, the registered location management module 16 may replace the image data of the object to be updated with the final candidate image data based on the comparison result of the feature points extracted from the final candidate image data and the image data of the object to be updated.

The registered location management module 16 may update the transit location information based on the image data received from the vehicle terminals 30.

The registered location management module 16 may select a candidate group which is selectable as the image data of the transit location among the received image data based on the image data received from the vehicle terminals 30 and additional information on each image data. When the candidate group of each transit location is selected, the registered location management module 16 may extract the obstacle information, the moving object information, the facility information, and the like, from each image data selected as the candidate group, and may determine the priority of each image data included in the candidate group based on the extracted information. Furthermore, the registered location management module 16 may select the image data having a highest priority in the candidate group of each transit location as the final candidate image data of that transit location, and may update the image information related to the corresponding transit location stored in the registered location database 13 by use of the selected final candidate image data. Here, selecting the final candidate image data corresponding to each transit location among the image data received from the vehicle terminals 30 and updating the image information related to the transit location by use of the selected final candidate image data may be performed in the same way as selecting the final candidate image data correspond to each of the get-on-and-off locations and updating the image information related to the get-on-and-off locations by use of the selected final candidate image data.

The charging module 17 may receive service use information related to the user (information on the get-on location and the get-off location, travel distance information, and the like) from the service providing module 18, and may determine a fare according to service use of the user based on the received service use information. For example, the charging module 17 may determine the fare according to the distance the user travels using a vehicle that provides the passenger transportation service. When the fare according to service use of the user is determined, the charging module 17 may transmit the charging information including information on the determined fare to the service providing module 18.

The service providing module 18 may receive service request information requesting the passenger transportation service from the user terminal 20 through the communication module 14. The service request information may include destination information and position information related to the user. Upon receiving the service request information related to the user, the service providing module 18 may select the get-on location and the get-off location of the user based on the get-on-and-off location information stored in the registered location database 13. The service providing module 18 may select the get-on-and-off locations which is most easily accessible (or, positioned in a shortest distance) from the position indicated by the position information related to the user among previously registered get-on-and-off locations as the get-on location of the user based on the get-on-and-off location information stored in the registered location database 13. Furthermore, the service providing module 18 may select the get-on-and-off locations which is most easily accessible from the position indicated by the destination information related to the user among the previously registered get-on-and-off locations as the get-off location of the user based on the get-on-and-off location information stored in the registered location database 13. When the get-on location and the get-off location of the user are selected, the service providing module 18 may transmit the information on the get-on location and the get-off location to the user terminal 20.

Furthermore, the service providing module 18 may select a vehicle to pass through the selected get-on location and get-off location, based on information on the selected get-on location and get-off location and the vehicle information related to each vehicle stored in the vehicle database 11. For example, the service providing module 18 may select, a vehicle to pass through the get-on location and the get-off location of the user, that is, a vehicle to provide the transportation service to the user among currently running vehicles, based on the vehicle running information included in the vehicle information related to each vehicle.

When the vehicle to provide the transportation service to the user is selected, the service providing module 18 may transmit information on the get-on location and the get-off location, information on the expected get-on time and the expected get-off time, and the like, to the vehicle terminal 30 of the selected vehicle. Furthermore, the service providing module 18 may also transmit the information on the expected get-on time and the expected get-off time and the vehicle information related to the selected vehicle (a vehicle identification number, a vehicle driver's contact information, a current position, and the like) to the user terminal 20. The service providing module 18 may additionally transmit the same user identification information to the user terminal 20 and the vehicle terminal 30 of the selected vehicle such that the driver of the selected vehicle may identify the user.

The service providing module 18 may additionally transmit the image data of the get-on location when transmitting the get-on location information to the user terminal 20. When the get-on location of the user is selected, the service providing module 18 may read the image information corresponding to the selected get-on location from the registered location database 13, and may transmit the image data of the get-on location to the user terminal 20 by use of such.

When the image data included in the image information related to the selected get-on location are in a plurality, the service providing module 18 may identify the approaching direction of the user with respect to the get-on location the position information related to the user. Furthermore, the service providing module 18 may transmit, the image data of which the identified approaching direction of the user and the photographing direction (i.e., approaching direction) match each other among the image data included in the image information related to the selected get-on location, to the user terminal 20, as the image data of the get-on location.

The user terminal 20 that received the image data of the get-on location from the operation server 10 may display such in a display of the user terminal 20. As described above, the image data of the get-on location is an image data actually photographing the surrounding environment of the get-on location. Therefore, the image data of the get-on location provides intuitive information with respect to the get-on location to the user such that the user may easily reach the get-on location, increasing the user's convenience. By providing image data for the get-on location photographed in the approaching direction of the user as the image of the get-on location, the user may identify the get-on location more easily.

When transmitting the get-on location information and the get-off location information to the vehicle terminal 30 of the vehicle selected as the transportation vehicle of the user, the service providing module 18 may also additionally transmit image data of the get-on location and image data of the get-off location. When the get-on location and the get-off location of the user are selected, the service providing module 18 may read the image information corresponding to each of the selected get-on location and get-off location from the registered location database 13, and may transmit the image data of each of the get-on location and the get-off location to the vehicle terminal 30 of the selected vehicle by use of such.

When the image data included in the image information related to the selected get-on location are in a plurality, the service providing module 18 may identify the approaching direction of the vehicle with respect to the get-on location based on current position information related to the vehicle selected as transportation vehicle. Furthermore, the service providing module 18 may transmit, the image data of which the identified approaching direction of vehicle and the photographing direction (i.e., approaching direction) match each other among the image data included in the image information related to the selected get-on location, to the vehicle terminal 30, as the image data of the get-on location.

When the image data included in the image information related to the selected get-off location are in plurality, the service providing module 18 may identify the approaching direction of the vehicle with respect to the get-off location based on the vehicle running information related to the selected vehicle. Furthermore, the service providing module 18 may transmit, the image data of which the identified approaching direction of vehicle and the photographing direction (i.e., approaching direction) match each other among the image data included in the image information related to the selected get-off location, to the vehicle terminal 30, as the image data of the get-off location.

When the vehicle approaches the get-on location within a predetermined distance, the vehicle terminal 30 that received the image data of the get-on location from the operation server 10 may display the received image data of the get-on location through the display of the vehicle terminal 30. Furthermore, when the vehicle approaches the get-off location within a predetermined distance, the vehicle terminal 30 that received the image data of the get-off location from the operation server 10 may display the received image data of the get-off location through the display of the vehicle terminal 30. The image data of the get-on location or the get-off location displayed through the display of the vehicle terminal 30 provides intuitive information with respect to the get-on location or the get-off location such that the vehicle driver may easily reach the get-on location or the get-off location, increasing the vehicle driver's convenience. The image data photographed in the approaching direction of the vehicle with respect to the get-on location and the get-off location are provided as the image of the get-on location and the get-off location, facilitating the driver to identify the get-on location and the get-off location more easily.

The service providing module 18 may also additionally transmit information on at least one transit location included in the path from the get-on location to the get-off location to the vehicle terminal 30 of the vehicle selected as the transportation vehicle of the user. The service providing module 18 may identify the transit location included in the path between the get-on location and the get-off location of the user, based on the transit location information stored in the registered location database 13. Furthermore, when the transit location information stored in the registered location database 13 exists with respect to at least one transit location included in the path from the get-on location to the get-off location, that transit location information may be transmitted to the vehicle terminal 30.

When a plurality of transit location image data are included in the transit location information related to the transit location positioned in the path from the get-on location to the get-off location, the service providing module 18 may identify the approaching direction of the vehicle with respect to that transit location based on the vehicle running information related to the vehicle selected as the transportation vehicle. When the approaching direction of the vehicle with respect to the transit location is identified, the service providing module 18 may transmit, the image data of which the approaching direction of the vehicle and the photographing direction (i.e., approaching direction) match each other among the image data included in the transit location information related to that transit location, as the image data of that transit location, to the vehicle terminal 30.

When the vehicle approaches corresponding transit location within a predetermined distance, the vehicle terminal 30 that received the image data of the transit location from the operation server 10 may display the received image data of transit location through the display of the vehicle terminal 30. Accordingly, the image of the transit location displayed through the vehicle terminal 30 provides intuitive information with respect to the transit location to the vehicle driver, increasing the vehicle driver's convenience. The image data photographed in the approaching direction of the vehicle with respect to the transit location are provided as the image of the transit location, and thereby the driver may easily identify a path of the vehicle at a branch road, and the like.

Furthermore, the service providing module 18 may transmit service use information related to the user (information on the get-on location and the get-off location, travel distance information, and the like) to the charging module 17, and may receive charging information corresponding thereto from the charging module 17. The travel distance information included in the service use information corresponds to a running distance of the vehicle running from the get-on location to the get-off location, and may be determined based on the map information stored in the map database 12. When the charging information is received from the charging module 17, the service providing module 18 transmits the same to the user terminal 20 to request payment of the fare for using the service.

Regarding the above-configured operation server 10, functions of the traffic information reception module 15, the registered location management module 16, the charging module 17, and the service providing module 18 may be performed by at least one processor realized with at least one central processing unit (CPU), other chipsets, or a microprocessor.

Hereinafter, an operation method of the operation server 10 providing the passenger transportation service is described with reference to FIG. 3 to FIG. 5.

Figure 3:
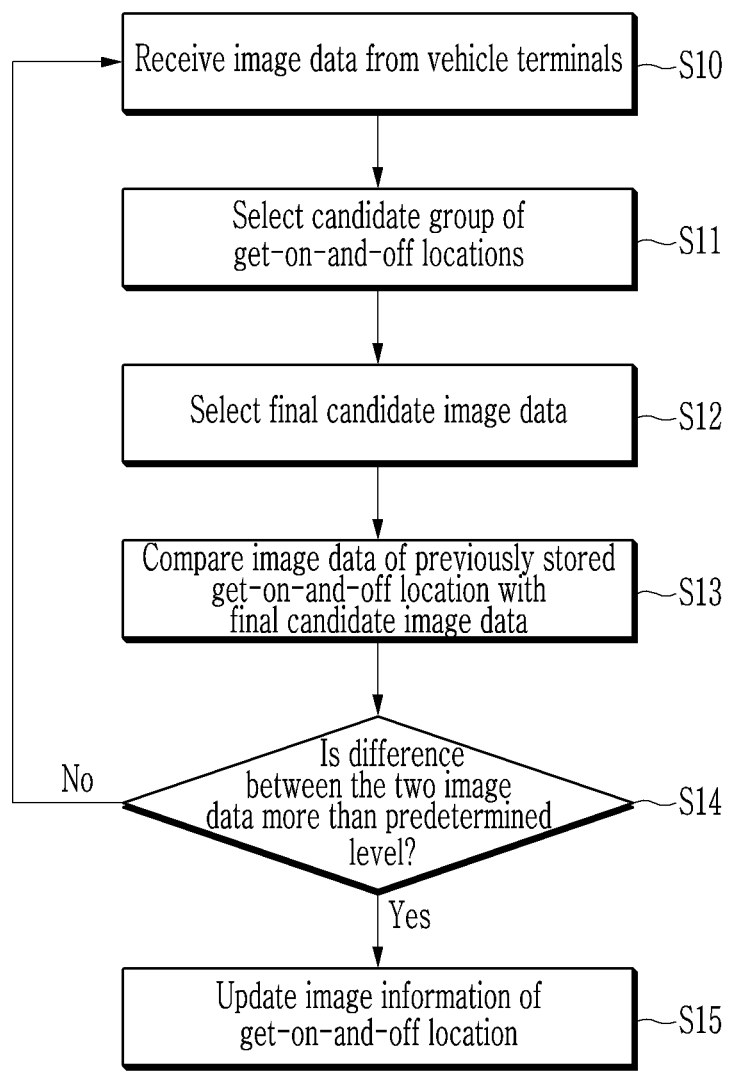
FIG. 3 is a flowchart showing a method for managing get-on-and-off locations by an operation server according to an exemplary embodiment of the present invention.

FIG. 3 is a flowchart showing a method for managing the get-on-and-off locations by an operation server according to an exemplary embodiment of the present invention.

Referring to FIG. 3, at step S10, the operation server 10 may receive image data photographing the surrounding environment of the driving road from the vehicle terminal 30. At the step S10, the operation server 10 may receive, along with the image data, additional information related to each image data, for example, position information and running direction, get-on-and-off record, and the like of the vehicle at the time of photographing that image data.

At step S11, the operation server 10 selects a candidate group selectable as image data of the previously registered get-on-and-off locations among the image data received through the step S10. At the step S11, the operation server 10 may select image data of which the vehicle position at the time of photographing that image data corresponds to the previously registered get-on-and-off locations among the image data received through the step S10, as the candidate group of corresponding get-on-and-off location.

When the image data of the get-on-and-off locations candidate group selected through the step S11, at step S12, the operation server 10 selects the final candidate image data of the get-on-and-off locations among the image data included in the candidate group.

At the step S12, the operation server 10 may extract various information (the obstacle information, the moving object information, the facility information, and the like) from each image data selected as the candidate group by performing the object detection algorithm, the sign recognition algorithm, and the like, and may select the final candidate image data from the image data included in the candidate group on the extracted information.

When the final candidate image data of the get-on-and-off locations are selected through the step S12, at step S13, the operation server 10 compares image data of that get-on-and-off locations stored in the registered location database 13 with the final candidate image data. Furthermore, when the difference between the two image data is above a predetermined level (S14-Yes), at step S15, the image information related to that get-on-and-off locations stored in the registered location database 13 is updated by use of the final candidate image data.

At the step S13, the operation server 10 may extract feature points respectively from the final candidate image data and image data of that get-on-and-off locations stored in the registered location database 13, and may compare the extracted feature points with each other.

Meanwhile, the image information related to the get-on-and-off locations stored in the registered location database 13 may include the plurality of image data corresponding to different photographing directions (or, approaching directions). In the instant case, the operation server 10 may select one among the plurality of image data included in the image information as the object to be updated, and at the step S13, may compare the selected image data of the object to be updated with the final candidate image data. Furthermore, at the step S15, the operation server 10 may update the image data selected as the object to be updated among the image data included in the image information related to the get-on-and-off locations by the final candidate image data.

Figure 4:
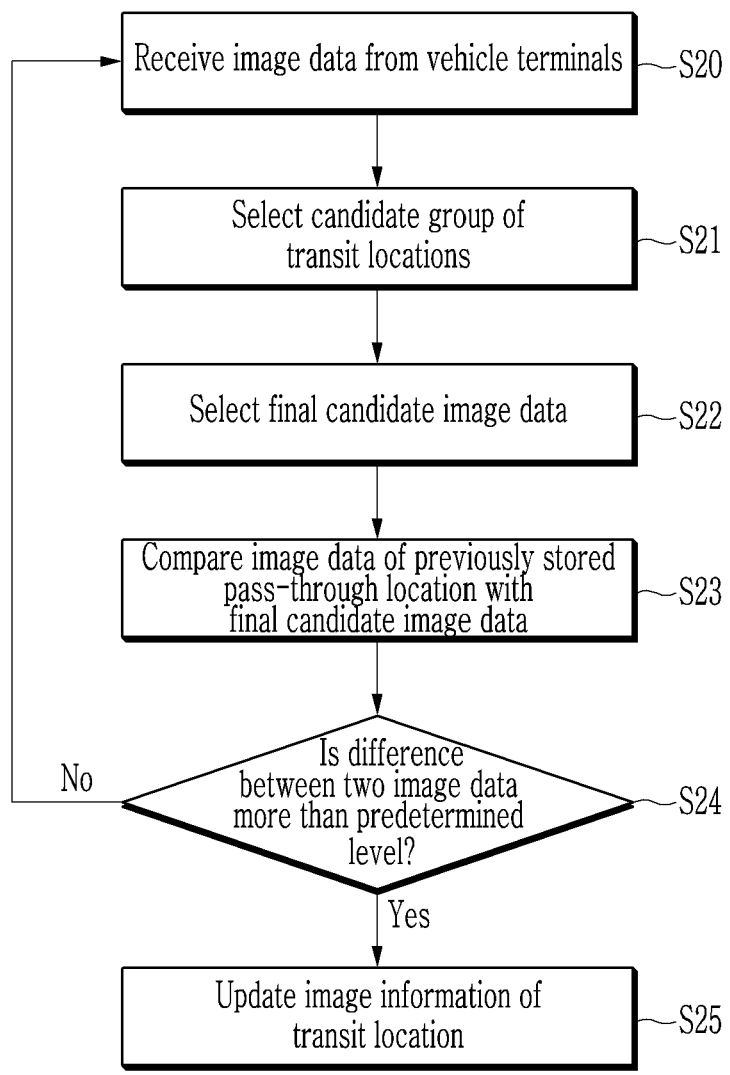
FIG. 4 is a flowchart showing a method for managing transit locations by an operation server according to an exemplary embodiment of the present invention.

FIG. 4 is a flowchart showing a method for managing transit locations by an operation server according to an exemplary embodiment of the present invention.

Referring to FIG. 4, at step S20, the operation server 10 may receive image data photographing the surrounding environment of the driving road from the vehicle terminals 30. At the step S20, the operation server 10 may receive, along with the image data, additional information related to each image data, for example, position information and running direction, get-on-and-off record, and the like of the vehicle at the time of photographing that image data.

At step S21, the operation server 10 selects a candidate group selectable as image data of the previously registered transit location among the image data received through the step S20. At the step S21, the operation server 10 may select image data of which the vehicle position at the time of photographing that image data corresponds to the previously registered transit location among the image data received through the step S20, as the candidate group of corresponding transit location.

When the image data candidate group of the transit location is selected through the step S21, at step S22, the operation server 10 selects the final candidate image data of the transit location among the image data included in the candidate group.

At the step S22, the operation server 10 may extract various information (the obstacle information, the moving object information, the facility information, and the like) from each image data selected as the candidate group by performing the object detection algorithm, the sign recognition algorithm, and the like, and may select the final candidate image data of the transit location from the image data included in the candidate group on the extracted information.

When the final candidate image data of the transit location are selected through the step S22, at step S23, the operation server 10 compares the image data of that transit location stored in the registered location database 13 with the final candidate image data. Furthermore, when the difference between the two image data is above a predetermined level (S24-Yes), at step S25, the image information related to that transit location stored in the registered location database 13 is updated by use of the final candidate image data.

At the step S23, the operation server 10 may extract feature points respectively from the final candidate image data and the image data of that transit location stored in the registered location database 13, and may compare the extracted feature points with each other.

Meanwhile, the image information related to the transit location stored in the registered location database 13 may include the plurality of image data corresponding to different photographing directions (or, approaching directions). In the instant case, the operation server 10 may select one among the plurality of image data included in the image information as the object to be updated, and at the step S23, may compare the selected image data of the object to be updated with the final candidate image data. Furthermore, at the step S25, the operation server 10 may update the image data selected as the object to be updated among the image data included in the image information related to the transit location by the final candidate image data.

FIG. 5 is a flowchart showing a method for providing the passenger transportation service by an operation server according to an exemplary embodiment of the present invention.

Referring to FIG. 5, at step S30, the operation server 10 receives service request information requesting the passenger transportation service from the user terminal 20. Here, the service request information may include destination information and position information related to the user.

Upon receiving the service request information from the user terminal 20, at step S31, the operation server 10 selects the get-on location and the get-off location of the user based on the get-on-and-off location information stored in the registered location database 13. Furthermore, at step S32, the operation server 10 transmits get-on-and-off information including the image data of the selected get-on location to the user terminal 20.

At the step S31, the operation server 10 may select the get-on-and-off locations which is most easily accessible (or, positioned in a shortest distance) from the position indicated by the position information related to the user among previously registered get-on-and-off locations, as the get-on location of the user, based on the get-on-and-off location information stored in the registered location database 13. Furthermore, the operation server 10 may select the get-on-and-off locations which is most easily accessible from the position indicated by the destination information related to the user among the previously registered get-on-and-off locations as the get-off location of the user based on the get-on-and-off location information stored in the registered location database 13.

At the step S32, get-on-and-off information may include identification information and position information related to each of the selected get-on location and get-off location, and image data of the selected get-on location. When the get-on location and the get-off location are selected, the operation server 10 may obtain get-on-and-off location information corresponding to the selected get-on location and get-off location from the registered location database 13, and may generate get-on-and-off information to be transmitted to the user terminal 20 based on such.

When the get-on location and the get-off location are selected, at step S33, the operation server 10 selects a vehicle to pass through the selected get-on location and get-off location based on information on the selected get-on location and get-off location and the vehicle information related to each vehicle stored in the vehicle database 11. At the step S33, the operation server 10 may select a vehicle to pass through the get-on location and the get-off location of the user, that is, a vehicle to provide the transportation service to the user, among currently running vehicles, based on the vehicle running information included in the vehicle information related to each vehicle.

When the vehicle to provide the transportation service to the user is selected through the step S33, the operation server 10 transmits vehicle information related to the selected vehicle to the user terminal 20 at step S34, and transmits get-on-and-off information including the image data of the get-on location and the get-off location to the vehicle terminal 30 of the selected vehicle at step S35.

At the step S34, the vehicle information may include a vehicle identification number, vehicle driver's contact information, a current position information related to the vehicle, and the like, and may be obtained from the vehicle database 11. At the step S34, the operation server 10 may also transmit information on the expected get-on time and the expected get-off time, along with the vehicle information.

At the step S35, the get-on-and-off information may include identification information and position information related to each of the selected get-on location and get-off location, and image data of each of the selected get-on location and get-off location. When the get-on location and the get-off location are selected, the operation server 10 obtains the get-on-and-off location information corresponding to the selected get-on location and get-off location from the registered location database 13, and based on such, may generate the get-on-and-off information to be transmitted to the vehicle terminal 30.

When the service use information such as information on the selected get-on location and get-off location, vehicle information on the selected vehicle, and the like are received from the operation server 10, the user terminal 20 may display the received service use information through the display. After confirming this, the user may move to the selected get-on location and waits for getting-on of the vehicle, and when the selected vehicle reaches the get-on location, the user may get on the vehicle and use the passenger transportation service.

Furthermore, when the get-on-and-off information is received from the operation server 10, the vehicle terminal 30 moves to the selected get-on location to board the designated user, and disembarks the user at the selected get-off location, providing the passenger transportation service to the user.

In the above-described exemplary embodiment of the present invention, the operation method of the operation server may be implemented as a computer-readable code on a medium in which a program is recorded. The computer-readable media includes all types of recording devices that store data which may be read by a computer system. Examples of computer-readable media include hard disk drive (HDD), solid state disk (SSD), silicon disk drive (SDD), ROM, RAM, CD-ROM, magnetic tape, floppy disk, optical data storage device, and the like, and may also include those implemented in a form of a carrier wave (e.g., transmission through the Internet). Furthermore, the computer may include a controller of a terminal.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A server for providing a passenger transportation service, the server comprising:
    a registered location database configured to store position information and image information related to each of previously registered get-on-and-off locations;
    a registered location management module configured to receive image data photographed from vehicles providing the passenger transportation service during running and additional information including position information related to each of the image data, and to update the image information based on the additional information by use of the image data; and
    a service providing module configured to, upon receiving a service provision request including position information and destination information related to a user from a user terminal, select a get-on location and a get-off location from among the get-on-and-off locations based on the position information and the destination information related to the user, and to transmit get-on-and-off information including image data of the get-on location to the user terminal,
    wherein the service providing module is configured to obtain image data of the get-on location from the image information related to a location selected as the get-on location from among the get-on-and-off locations.

2. The server of claim 1, wherein the registered location management module is configured to:
    select a candidate group corresponding to each in the get-on-and-off locations among the image data based on the position information related to each of the image data;
    give priority to each image data included in the candidate group based on object information extracted from each image data included in the candidate group;
    select image data having a highest priority among image data included in the candidate group as final candidate image data; and
    update the image information related to corresponding get-on-and-off locations by use of the final candidate image data.

3. The server of claim 2,
    wherein the object information includes information on a ratio of an obstacle or a ratio of a moving object in corresponding image data, and
    wherein the registered location management module is configured to set a priority of the corresponding image data lower as the ratio of the object corresponding to the obstacle or the ratio of the moving object is higher.

4. The server of claim 3, wherein the registered location management module is configured to exclude image data of which the ratio of the obstacle in the image data or the ratio of the moving object in the image data is above a predetermined value from the candidate group.

5. The server of claim 2,
    wherein the object information includes information on identified facility within corresponding image data, and
    wherein the registered location management module is configured to set a priority of the corresponding image data to be high, when the identified facility is a facility registered as a point of interest (POI), or when the identified facility is a predetermined type of facility.

6. The server of claim 2,
    wherein the additional information further includes information on a running direction of the vehicle at photographing with respect to each of the image data, and
    wherein the registered location management module is configured to, with respect to the image information including a plurality of image data corresponding to different photographing directions, select image data of which a photographing direction corresponds to the running direction of the final candidate image data among the plurality of image data included in the image information as an object to be updated, and update the image data selected as the object to be updated by use of the final candidate image data.

7. The server of claim 1, wherein, when the image information related to the get-on-and-off locations selected as the get-on location includes a plurality of image data corresponding to different photographing directions, the service providing module is configured to:
    obtain an approaching direction of the user to the get-on location based on position information related to the user; and
    select image data whose corresponding photographing direction matches the approaching direction among the plurality of image data as image data of the get-on location.

8. The server of claim 1, further including a vehicle database including vehicle information related to each of the vehicles,
    wherein the service providing module is configured to, based on the position information and the destination information related to the user and the vehicle information:

select a vehicle to provide the passenger transportation service to the user from the vehicles;
obtain image data of the get-off location from the image information related to a location selected as the get-off location from among the get-on-and-off locations; and
transmit the get-on-and-off information including the image data of the get-on location and the image data of the get-off location to a vehicle terminal of the selected vehicle.

9. The server of claim 8, wherein the service providing module is configured to transmit information on at least one of vehicle identification number, a driver's contact number, and a current position of the selected vehicle to the user terminal.

10. The server of claim 8,
wherein the registered location database is configured to store position information and image information related to each of previously registered transit locations; and
wherein the service providing module is configured to transmit position information and image data of each of at least one transit location included in a path from the get-on location to the get-off location among the transit locations, to the vehicle terminal.

11. The server of claim 10, wherein the registered location management module is configured to update image information related to each of the transit locations based on the additional information by use of the image data.

12. The server of claim 10, wherein the transit locations are locations corresponding to branch roads, intersections, roads with high complexity, or alleys.

13. An operation method of a server for providing a passenger transportation service, the operation method comprising:
storing position information and image information related to each of previously registered get-on-and-off locations;
receiving additional information including image data photographed from vehicles providing the passenger transportation service during running, and position information related to each of the image data;
updating image information related to each of the previously registered get-on-and-off locations by use of the image data, based on the additional information;
receiving a service provision request including position information and destination information related to a user from a user terminal;
selecting a get-on location and a get-off location from among the get-on-and-off locations based on the position information and the destination information related to the user;
obtaining image data of the get-on location from the image information related to a location selected as the get-on location from among the get-on-and-off locations; and
transmitting get-on-and-off information including image data of the get-on location to the user terminal.

14. The operation method of claim 13, wherein the updating includes:
selecting a candidate group corresponding to each in the get-on-and-off locations among the image data based on the position information related to each of the image data;
giving a priority to each image data included in the candidate group based on object information extracted from each image data included in the candidate group;
selecting image data having a highest priority among image data included in the candidate group as final candidate image data; and
updating the image information related to corresponding get-on-and-off locations by use of the final candidate image data.

15. The operation method of claim 14,
wherein the object information includes information on a ratio of an obstacle or a ratio of a moving object in corresponding image data; and
wherein the giving of the priority includes setting the priority of the corresponding image data lower as the ratio of the object corresponding to the obstacle or the ratio of the moving object is higher.

16. The operation method of claim 14,
wherein the object information includes information on an identified facility within corresponding image data;
wherein the giving of the priority includes setting the priority of the corresponding image data to be high when the identified facility is a facility registered as a point of interest (POI), or when the identified facility is a predetermined type of facility.

17. The operation method of claim 14,
wherein the additional information further includes information on a running direction of the vehicle at photographing with respect to each of the image data; and
wherein the updating includes:
selecting, with respect to the image information including a plurality of image data corresponding to different photographing directions, image data of which a photographing direction matches the running direction of the final candidate image data among the plurality of image data included in the image information as an object to be updated; and
updating the image data selected as the object to be updated by use of the final candidate image data.

18. The operation method of claim 13, wherein the obtaining of the image data of the get-on location includes:
obtaining an approaching direction of the user to the get-on location based on position information related to the user, when the image information related to the get-on-and-off locations selected as the get-on location includes a plurality of image data corresponding to different photographing directions; and
selecting image data whose corresponding photographing direction matches the approaching direction among the plurality of image data as image data of the get-on location.

19. The operation method of claim 13, further including:
obtaining image data of the get-off location from the image information related to a location selected as the get-off location from among the get-on-and-off locations;
selecting a vehicle to provide the passenger transportation service to the user from the vehicles based on position information and the destination information related to the user and vehicle information related to each of the vehicles; and
transmitting get-on-and-off information including the image data of the get-on location and image data of the get-off location to a vehicle terminal of a selected vehicle.

20. The operation method of claim 19, further including transmitting information on at least one of vehicle identification number, a driver's contact number, and a current position of the selected vehicle to the user terminal.

21. The operation method of claim 19, further including transmitting position information and image data of each of at least one transit location included in a path from the get-on location to the get-off location among previously registered transit locations, to the vehicle terminal.

\* \* \* \* \*